United States Patent
Dommett et al.

(10) Patent No.: US 9,342,883 B2
(45) Date of Patent: May 17, 2016

(54) OMNIBUS RESOLUTION ASSESSMENT TARGET FOR SENSORS

(71) Applicant: The United States of America, as represented by the Secretary of the Air Force, Washington, DC (US)

(72) Inventors: David W Dommett, Beavercreek, OH (US); Alan R Pinkus, Bellbrook, OH (US); Harry Lee Task, Tucson, AZ (US)

(73) Assignee: The United States of America, as represented by the Secretary of the Air Force, Washington, DC (US)

( * ) Notice: Subject to any disclaimer, the term of this patent is extended or adjusted under 35 U.S.C. 154(b) by 350 days.

(21) Appl. No.: 14/164,330

(22) Filed: Jan. 27, 2014

(65) Prior Publication Data
US 2015/0187074 A1  Jul. 2, 2015

Related U.S. Application Data

(60) Provisional application No. 61/921,180, filed on Dec. 27, 2013.

(51) Int. Cl.
*H04N 17/00*  (2006.01)
*G06T 7/00*  (2006.01)

(52) U.S. Cl.
CPC ............. *G06T 7/0018* (2013.01); *G06T 7/0004* (2013.01); *G06T 2207/30168* (2013.01); *G06T 2207/30208* (2013.01)

(58) Field of Classification Search
CPC ................... G06T 2207/3028; G06T 7/0004; G06T 7/0018
USPC .......... 348/187, 180, 188, 140, 135; 382/181, 382/165
See application file for complete search history.

(56) References Cited

U.S. PATENT DOCUMENTS

| 8,483,486 B1 | 7/2013 | Pinkus et al. |
| 8,620,069 B1 | 12/2013 | Pinkus et al. |
| 2007/0285537 A1* | 12/2007 | Dwinell ................. G06T 7/001 348/263 |
| 2014/0002673 A1* | 1/2014 | Wu ...................... H04N 17/002 348/187 |

OTHER PUBLICATIONS

Pinkus, A.R., et al., A comparison of Landolt C and triangle resolution targets using the synthetic observer approach to sensor resolution assessment. Proc SPIE, vol. 8392-45 (2012).

Pinkus, A.R., et al., "A Comparison of synthetic and human observer approaches to multispectral sensor resolution assessment," Proc. SPIE 8042,80420V (2011).

(Continued)

*Primary Examiner* — Jefferey Harold
*Assistant Examiner* — Jean W Desir
(74) *Attorney, Agent, or Firm* — AFMCLO/JAZ; Charles Figer, Jr.

(57) ABSTRACT

A method and system are provided to assess a resolution of an optical sensor. The method includes placing a target at a distance from a focal plane of the optical sensor. The target is oriented in a first orientation and includes a grid and a plurality of test objects having different sizes and orientations. An image of the target is acquired from the optical sensor. The target grid in the acquired image is identified. Each test object of the plurality of test objects is identified using the identified grid and an orientation of the identified test object is determined. The determined orientations of the identified test objects of the plurality of test objects are compared to a ground truth and presented.

13 Claims, 12 Drawing Sheets

(56) References Cited

OTHER PUBLICATIONS

Pinkus, A.R., et al., "Synthetic observer approach to multispectral sensor resolution assessment," Proc. SPIE 7689, 76890E (2010).
Pinkus, A.R., et al., "A Continuous Motion Object Recognition Methodology for the Assessment of Multi-spectral Fusion Algorithms," Proc. SPIE 7336-35 (2009).
Neriani, K.E., et al., An investigation of image fusing algorithms using a visual performance-based image evaluation methodology. Proceedingsof SPIE, Orlando, FL, vol. 6968-44 (2008).
Pinkus, A.R., et al., Dynamic stimulus enhancement with Gabor-based filtered images. Proceedings of SPIE, Orlando, FL, vol. 6989-63 (2008).
Bijl, P. et al., Guidelines for accurate TOD measurement. SPIE Proceedings, vol. 3701 14-25 (1999).

* cited by examiner

OMNIBUS RESOLUTION ASSESSMENT TARGET FOR SENSORS

CROSS-REFERENCE TO RELATED APPLICATIONS

This application is related to U.S. patent application Ser. No. 29/477,817, filed on Dec. 27, 2013, by Mr. David W. Dommett, Dr. Alan R. Pinkus, and Dr. Harry Lee Task, and entitled "Omnibus Resolution Assessment Target for Sensors" (AFD 1326DE), the entirety of which is incorporated by reference herein.

This application also claims the benefit of and priority to U.S. Provisional Application Ser. No. 61/921,180, also filed on Dec. 27, 2013, by Mr. David W. Dommett, Dr. Alan R. Pinkus, and Dr. Harry Lee Task, and entitled "Omnibus Resolution Assessment Target for Sensors" (AFD 1326P), the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates to pattern and object recognition, and more particularly to a method for detecting objects in a digital image.

2. Description of the Related Art

Over the years, there have been many methods developed to determine an image quality of an image-generating system such as a sensor/display combination. In many cases, the final consumer of the image produced is a human observer using their visual capability to extract visual information from the displayed image. In recent years, imaging systems and image manipulation have moved from the analog world to the digital world, which has probably added a bit more confusion to the issue of image quality or resolution.

In general, resolution is the ability of a sensor/display system to produce detail; the higher the resolution, the finer the detail that can be displayed. With the advent of digital imagery and sensor detectors that are comprised of an array of discrete elements, it is tempting, and not entirely incorrect, to characterize the resolution of the system by the number of picture element (Pixels) for the display or sensor elements in the case of the sensor. For example, SVGA resolution for a computer display is 600 elements high by 800 elements wide. This describes the number of samples that can be displayed; however, the number of pixels alone says nothing of the quality of the actual display medium characteristics (luminance, contrast capability, noise, color, refresh rate, active area to total area ratio, etc.) or of the signal/information used to feed the individual pixels. Nevertheless, this numerical value of pixel or sensor element count is often given as a primary metric to the resolution (quality) of the sensor or display.

Another common approach to determining the resolution of a sensor/display system is to image an appropriate resolution test target and determine the smallest sized critical test pattern element that can be seen by a human observer. Many test patterns have been developed over the years such as gratings, tri-bars, tumbling Es, the Snellen chart, and the Landolt C chart to test vision or to test imaging systems using vision. For these tests, a single size test element is generally imaged at various distances until a distance is obtained at which the test object is barely resolved. This multiple imaging method at multiple distances can be cumbersome and time consuming.

Accordingly, there is a need in the art for a device and process that will allow a rapid, fully automatic resolution assessment of optical sensors that operate individually or simultaneously over multiple spectra without the need for multiple images at multiple distances.

SUMMARY OF THE INVENTION

Embodiments of the invention address the need in the art by providing a system configured to assess a resolution of an optical sensor. The system includes a target placed at a distance from a focal plane of the optical sensor. The target is oriented in a first orientation and includes a grid and a plurality of test objects having different sizes and orientations. The system further includes a computer having a memory and a processor. Program code resident in the memory is configured, when executed on the processor, to identify the target grid in an image of the target acquired by the optical sensor. Using the identified grid, the program code is further configured to identify each test object of the plurality of test objects and determine an orientation of the identified test object. The determined orientations of the identified test objects of the plurality of test objects are then compared to a ground truth and the comparisons are presented.

In some embodiments of the invention, the target further includes an asymmetrical pattern located at a center of the grid. In these embodiments the program code may be further configured to identify the target grid in the acquired image by identifying the asymmetrical pattern prior to identifying the grid. The grid in these embodiments may be identified by defining a distance between landmarks defining the grid and then beginning with a center landmark identified in the asymmetrical pattern, searching for landmarks at the defined distance away from the center landmark. The search for additional landmarks may then continue searching for landmarks at the defined distance away from the landmarks located in a previous search.

In a specific embodiment, the asymmetrical pattern is an L shaped pattern and the program code is further configured to identify the asymmetrical pattern by selecting a first potential landmark of the grid and searching for a matching landmark one landmark width to the right. If a landmark is found, then search for a matching landmark one landmark width above. Finally if that landmark is found, search for a matching landmark two landmark widths above. If the L shaped pattern is not located, then the process may be repeated up to 3 more times with the search directions appropriately altered in order to search all four cardinal directions.

In some embodiments of the invention, the program code is configured to identify each test object of the plurality of test objects and determine an orientation of the identified test object by defining a cell of adjacent landmarks of the grid. A center of each cell is calculated and a test object closest to each of the cell centers is located. The orientation of the located test object is then determined based on the type of test object. In some embodiments, the plurality of test objects on the target includes Landolt Cs. In other embodiments, the plurality of test objects on the target includes triangles.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1:
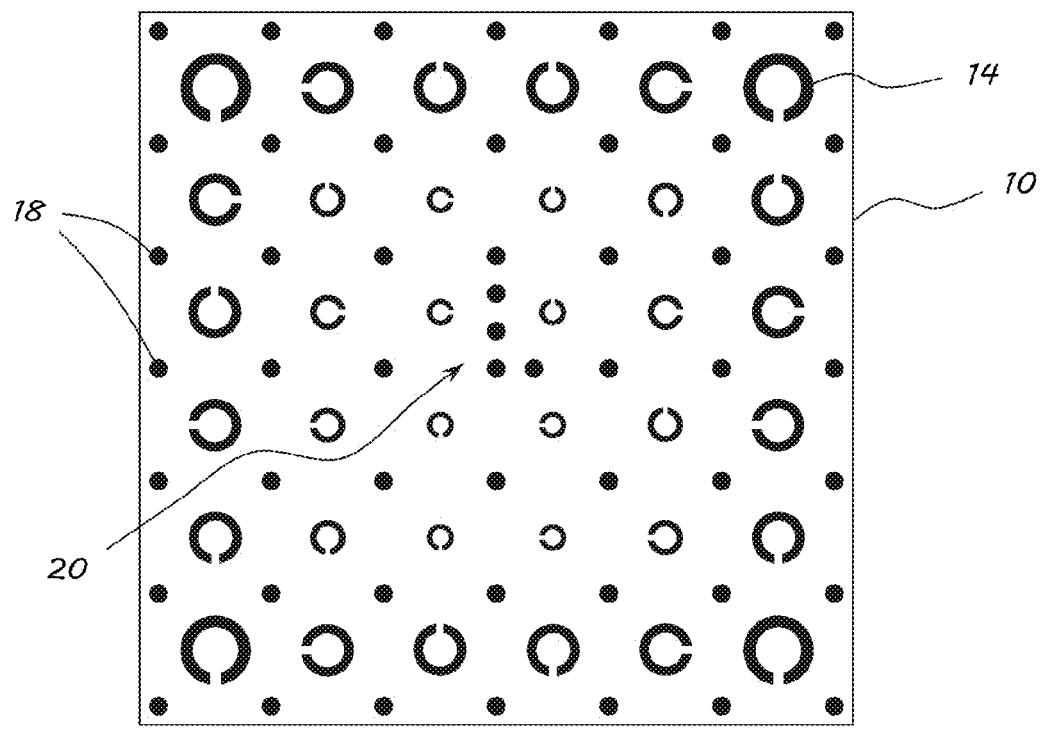
FIG. 1 is an exemplary target configuration for use with embodiments of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention provide an apparatus and process that provides rapid and fully automatic resolution assessment of optical sensors that operate individually or simultaneously in five different spectra: visible (about 0.4 to 0.7 µm), near-infrared (about 0.7 to 1 µm), short-wave infrared (about 1 to 1.2 µm), medium-wave infrared (about 3 to 5 µm), and long-wave infrared or thermal (about 7 to 12 µm). Advanced multispectral systems optically and/or algorithmically combine information from different parts of the electromagnetic spectrum to form images richer in tactical information than their single-band counterparts. Embodiments of the invention utilize a target, such as targets 10 and 12 in FIGS. 1 and 2, containing multiple test objects 14, 16 that may be symmetrical around a center point and that allow for a fast changing of test object 14, 16 orientations. The multiple test objects 14, 16 on the target may also be differently sized to cover the entire measurable resolution range of the sensor(s) when placed at only one test distance. In some embodiments, the targets 10, 12 may also include multispectral landmarks (such as holes) 18 that may be used to locate centers of each individual test object 14, 16. The landmarks 18 may also be utilized to calculate and then adjust to any optical distortions (e.g. barrel or pincushion) induced by the sensor's physical optics or test equipment misalignment.

In some embodiments, the target 10, 20 may be configured as a square matrix of resolution test objects 14, 16. For example, in a particular embodiment in FIG. 1, the target consists of a 6×6 array consisting of 36 test objects 14 comprised of 9 different sizes in each of 4 orientations (up, down, left, right). In this particular embodiment, the Landolt C was selected for the test object 14. Similarly, in the embodiment illustrated in FIG. 2, the target consists of a 6×6 array with 36 test objects 16 comprised of 9 different sizes in each of 4 orientations (up, down, left, right). In this illustrated embodiment, the triangles were selected for the test object 16. Other embodiments may utilize other test objects and different target sizes.

Figure 2:
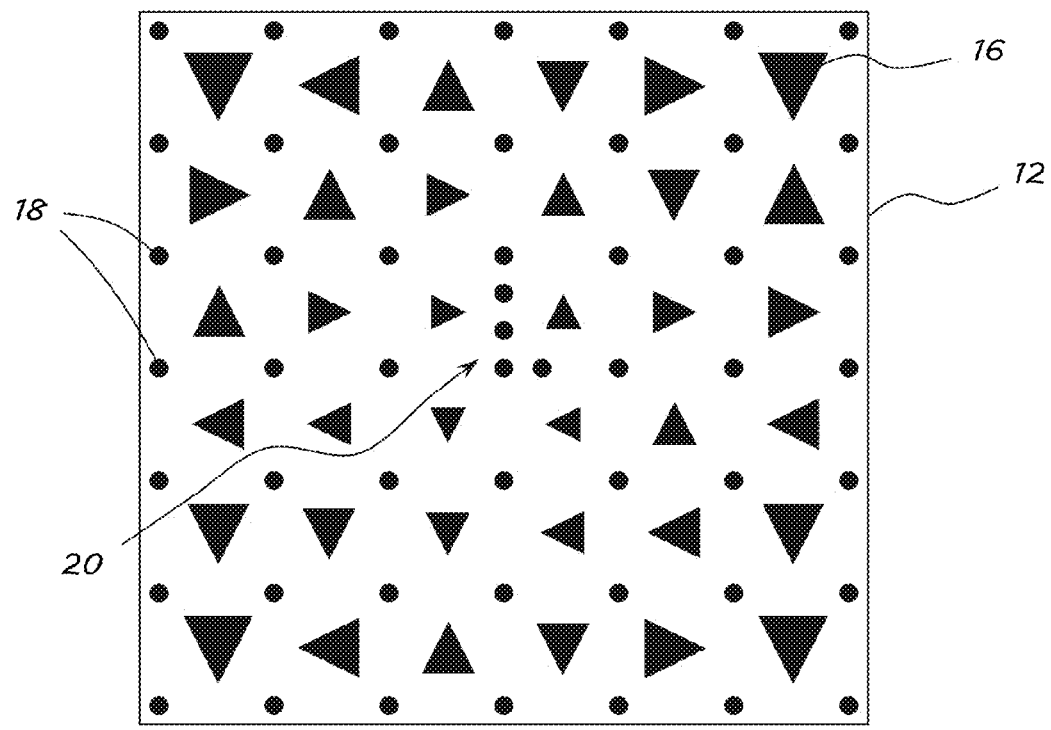
FIG. 2 is an alternate exemplary target configuration for use with embodiments of the invention.

The exemplary targets 10, 12 of FIGS. 1 and 2 additionally include a grid consisting of landmarks 18, which provides for a center point around which the targets 10, 12 may be rotated. The targets 10, 12 may be rotated to each of four orientations thereby changing the relative location (referenced to the upper left corner as positioned) of the various sized and oriented individual test objects 14, 16. Additionally, and in some embodiments, the target may contain an asymmetrical pattern 20 of landmarks 18 around the center point (e.g. the "L" arrangement in the centers of FIGS. 1 and 2). While an "L" pattern has been used for the embodiments illustrated in FIGS. 1 and 2, other asymmetrical patterns may also be used. The asymmetrical patterns may assist in enabling automatic software recognition of an orientation of the targets 10, 12. The asymmetrical pattern assists the automatic software recognition in obtaining a keyed "ground truth" results table for each of the four orientations of the target 10, 12 setup.

Modulation Transfer Functions (MTF) of a sensor will generally vary across a field of view and as a function of distance from center of a focal plane array. For this reason, in the illustrated embodiments of FIGS. 1 and 2, the smallest test objects 14, 16 are located towards the center of the target and the larger test objects 14, 16 to the outside. This arrangement assists in enabling the best chance at measurement of peak MTF for the sensor. Other embodiments may reverse this ordering as required to provide a "mapping" of the resolution of the sensor within its field of view by providing a "worst" case scenario.

Figure 3:
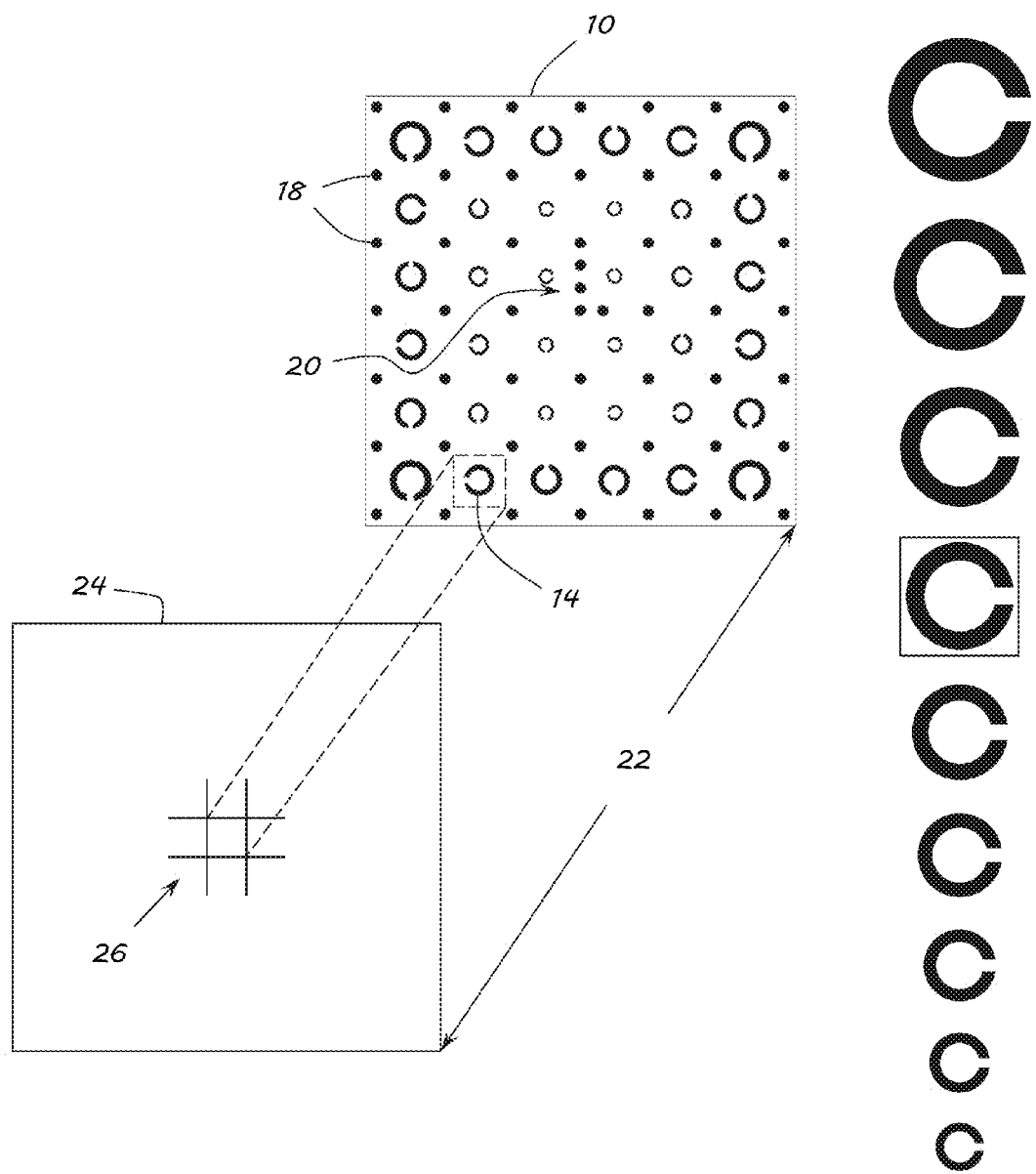
FIG. 3 is a diagrammatic representation of the target of FIG. 1 in relation to a focal plane of a sensor.

Targets 10, 12 may be placed a distance 22 from the sensor focal plane 24 such that a geometric resolution 26 of the sensor is equal to a critical resolution dimension of the test object 10, 12 (e.g. a gap size in the Landolt C) of a mid-sized test object as illustrated in FIG. 3. In the illustrated embodiments of targets 10, 12, which consist of nine different sizes of test objects, the mid-sized resolution test object is the fifth test object size. The target 10, 12 may then be placed axially in line with a center of the sensor. It is preferable to ensure that the target 10, 12 fits within a central area of a field of view of the sensor MTF will vary as a function of the distance 22 from the sensor. In some embodiments, the target may then be either back-lit and/or heated to produce good contrast in each of the several spectral bands to allow the assessment of various sensor types.

Software algorithms consistent with embodiments of the invention may be utilized to automatically detect the orientation of images representing the test objects 14, 16 on the target 10, 12. These software algorithms may be implemented in an exemplary hardware and software environment for an apparatus 30, diagrammatically illustrated in FIG. 4. For the purposes of the invention, apparatus 30 may represent practically any type of computer, computer system or other programmable electronic device, including a client computer, a server computer, a portable computer, a handheld computer, an embedded controller, etc. Moreover, apparatus 30 may be implemented using one or more networked computers, e.g., in a cluster or other distributed computing system. Apparatus 30 will hereinafter also be referred to as a "computer," although it should be appreciated that the term "apparatus" may also include other suitable programmable electronic devices consistent with embodiments of the invention.

Computer 30 typically includes a central processing unit (CPU) 32 including one or more microprocessors coupled to a memory 34, which may represent random access memory (RAM) devices comprising the main storage of computer 30, as well as any supplemental levels of memory, e.g., cache memories, non-volatile or backup memories (e.g., programmable or flash memories), read-only memories, etc. In addition, memory 34 may be considered to include memory storage physically located elsewhere in computer 30, e.g., any cache memory in a processor in CPU 32, as well as any storage capacity used as a virtual memory, e.g., as stored on a mass storage device 36 or on another computer coupled to computer 30.

Computer 30 also typically receives a number of inputs and outputs for communicating information externally. For interface with a user or operator, computer 30 typically includes a user interface 38 incorporating one or more user input devices 40 (e.g., a keyboard, a mouse, a trackball, a joystick, a touchpad, and/or a microphone, among others) and a display 42 (e.g., a CRT monitor, an LCD display panel, and/or a speaker, among others). Additionally, computer 30 may receive data directly from an imaging device 44. Otherwise, user input may be received via another computer or terminal, e.g., via a client or single-user computer (not shown) coupled to computer 30 over a network 46. This latter implementation may be desirable where computer 30 is implemented as a server or other form of multi-user computer. However, it should be appreciated that computer 30 may also be implemented as a standalone workstation, desktop, laptop, hand-held, or other single-user computer in some embodiments.

For non-volatile storage, computer 30 typically includes one or more mass storage devices 36, e.g., a floppy or other removable disk drive, a hard disk drive, a direct access storage device (DASD), an optical drive (e.g., a CD drive, a DVD drive, etc.), flash memory data storage devices (USB flash drive) and/or a tape drive, among others. Furthermore, computer 30 may also include an interface 48 with one or more networks 46 (e.g., a LAN, a WAN, a wireless network, and/or the Internet, among others) to permit the communication of information with other computers and electronic devices. It should be appreciated that computer 30 typically includes suitable analog and/or digital interfaces (e.g., BUS) between CPU 32 and each of components 34, 36, 38, and 48, as is well known in the art.

Computer 30 operates under the control of an operating system 50, and executes or otherwise relies upon various computer software applications, components, programs, objects, modules, data structures, etc. For example, an image detection algorithm 52 may be resident in memory 34 to analyze an image 54 also in memory or alternately resident in mass storage 36. Moreover, various applications, components, programs, objects, modules, etc. may also execute on one or more processors in another computer coupled to computer 30 via the network 46, e.g., in a distributed or client-server computing environment, whereby the processing required to implement the functions of a computer program, such as the image detection algorithm 52, may be allocated to multiple computers over the network 46.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable media include but are not limited to non-transitory physical, recordable type media such as volatile and non-volatile memory devices, floppy and other removable disks, hard disk drives, optical disks (e.g., CD-ROM's, DVD's, etc.), among others; and transmission type media such as digital and analog communication links In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 4:
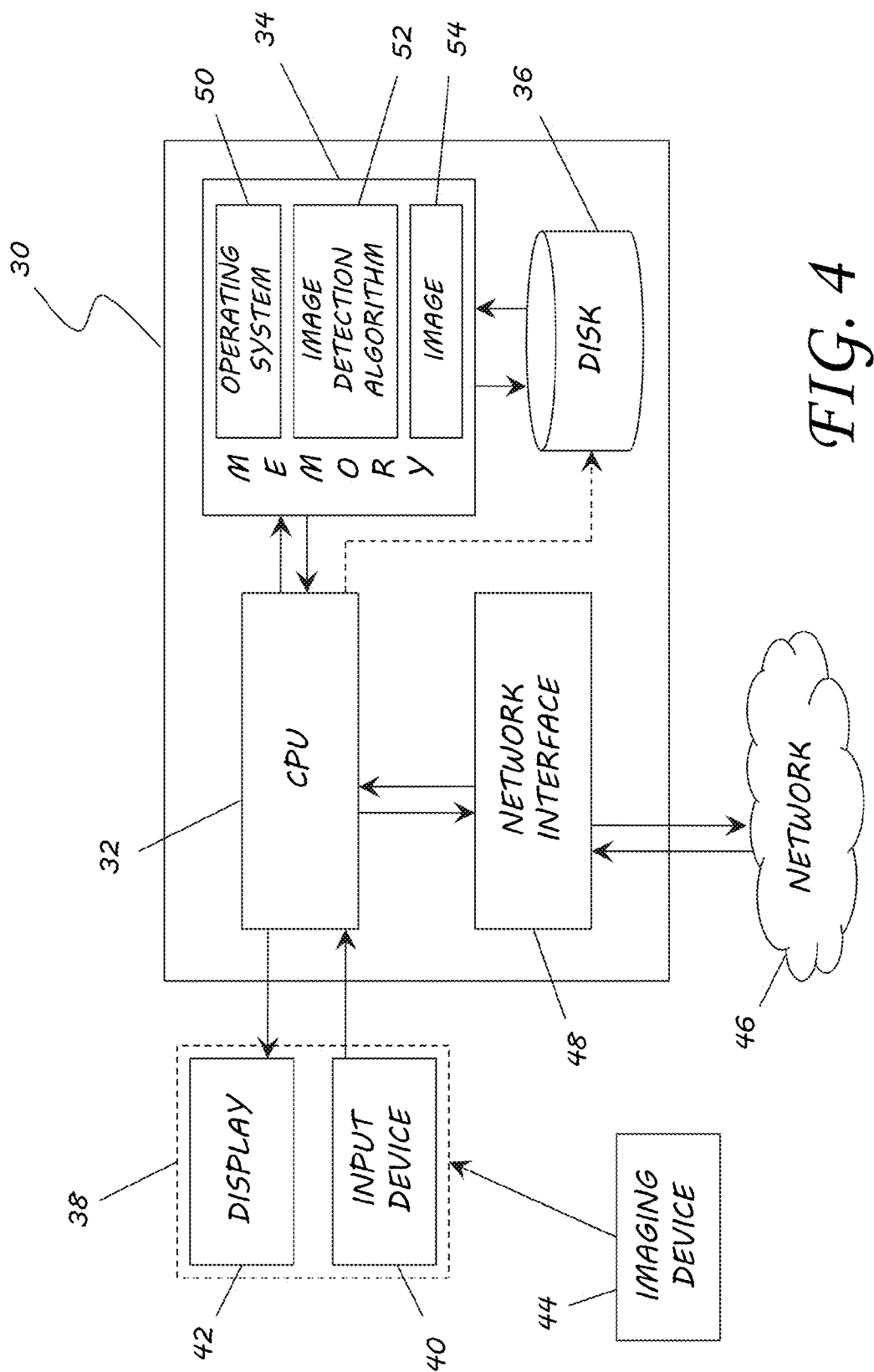
FIG. 4 is a diagrammatic representation of an exemplary hardware and software environment suitable for implementing embodiments of the invention.

Those skilled in the art will recognize that the exemplary environment illustrated in FIG. 4 is not intended to limit the present invention. Indeed, those skilled in the art will recognize that other alternative hardware and/or software environments may be used without departing from the scope of the invention.

Figure 5:
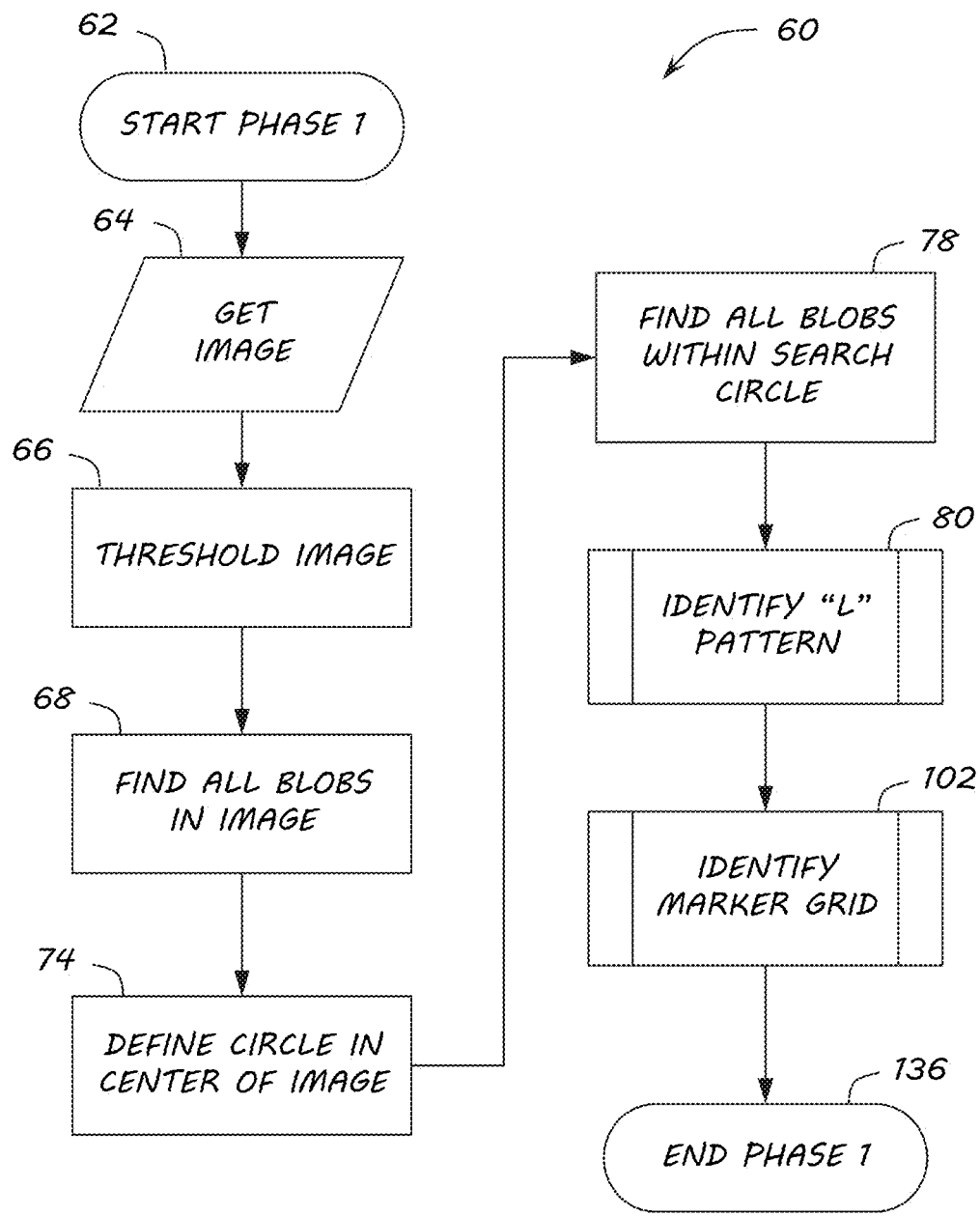
FIG. 5 is a flow diagram of a first phase of a process consistent with embodiments of the invention.
Figure 6:
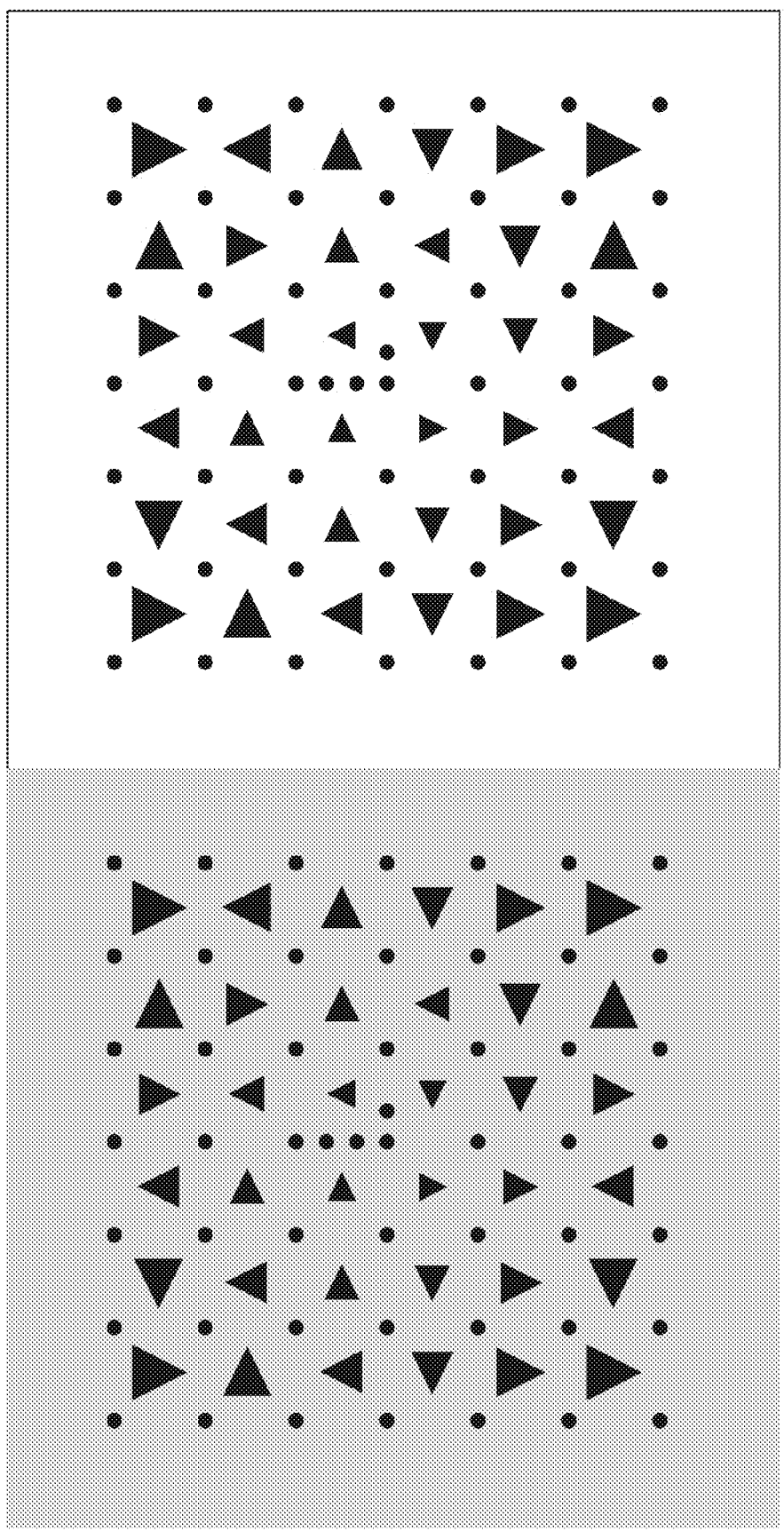
FIG. 6A is an exemplary image of the target configuration of FIG. 2.
FIG. 6B is a representation of the image of FIG. 6A after a thresholding process.

In some embodiments of the invention, the image detection algorithm 30 may be split into two phases. The first phase is the identification of the grid of landmarks 18 and orientation of the target and the second phase is the identification of the orientations of the test objects 14, 16. Flowchart 60 in FIG. 5 illustrates key steps for the first phase. Phase one begins at block 62. At block 64, an image is retrieved, either directly from a sensor, such as through a user interface 38 discussed above, or from previously collected image data that may be stored on a mass storage 36 or other device. At block 66, the image is subjected to a threshold such that a specific percentage of pixels are white. For example, FIG. 6A illustrates an exemplary acquired image. This image may contain both white and black pixels, as well as other colors. The thresholding process, in some embodiments converts the image to only white and black pixels, where pixels falling below the threshold value are set to black and pixels above the threshold value are set to white. A sample of the thresholding result is illustrated in FIG. 6B. Other embodiments may utilize other threshold techniques or other non-threshold techniques to prepare the image for further processing.

Figure 7:
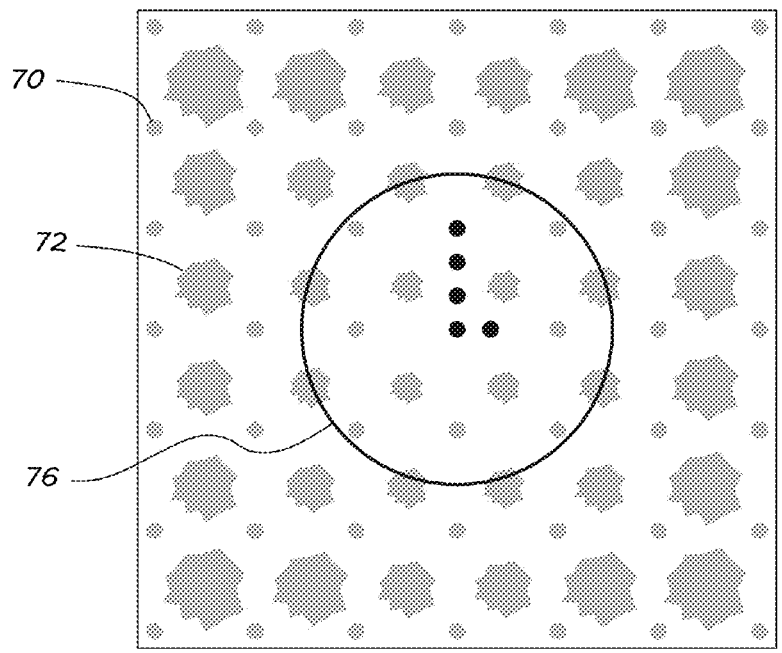
FIG. 7 illustrates a data reduction technique for locating items on a generic target.

After the image has been thresholded, all "blobs" in the image are located in block 68. Blobs are defined as an "island" of black pixels surrounded by white pixels. In the early stages of identification, these blobs may represent either landmarks 70 used to define the grid or test objects 72, which may be either triangles or Landolt Cs, or other objects in other embodiments as seen in FIG. 7. The term blobs will be used to represent the landmarks and test objects until they are further identified in subsequent steps. Next, in block 74, a circle 76 may be defined in the center of the image. Then in block 78, all of the blobs within the circle 74 are located. Circle 74 is used to assist in limiting the search for the asymmetric pattern in the center of the image. In other embodiments, other data reduction techniques may also be used.

Figure 8:
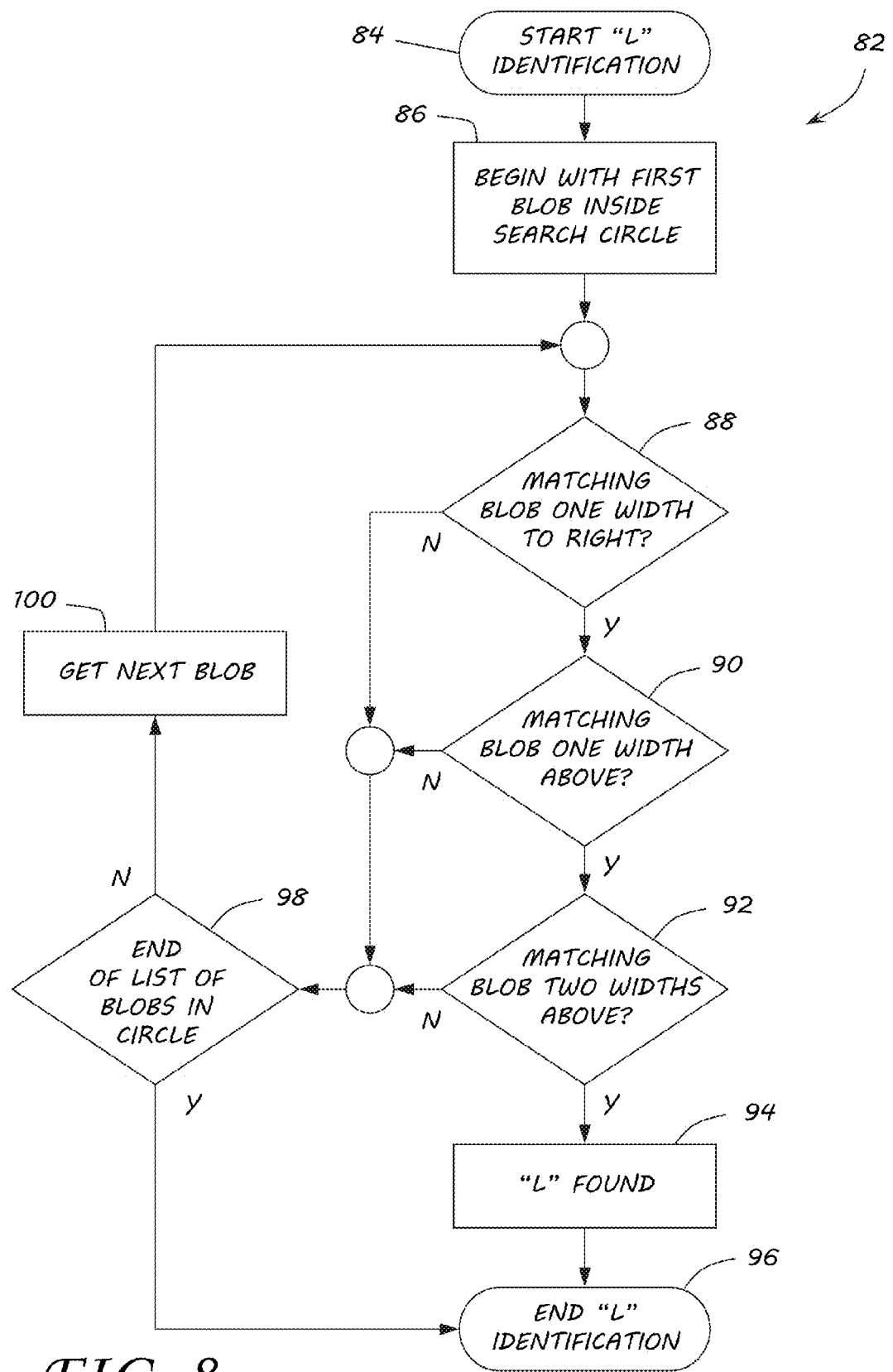
FIG. 8 is a flow diagram of a process of the first phase in FIG. 5.

After the blobs in circle 74 have been identified, the asymmetric pattern, "L" pattern 20 in the illustrated embodiments, is identified in block 80. Flowchart 82 in FIG. 8 provides additional detail for this process. The identification process begins at block 84. A first blob inside search circle 76 is selected in block 86. If a matching blob is located one width to the right ("Yes" branch of decision block 88), then a matching blob above the selected blob is searched for. If a matching blob is located one width above the selected blob ("Yes" branch of decision block 90), then a matching blob two widths above the selected blob is searched for. If a matching blob is located two widths above the selected blob ("Yes" branch of decision block 92), then the "L" pattern 20 is located in block 94 and the identification process ends at block 96.

If any of the blobs to the right or above are not located ("No" branches of decision blocks 88, 90, and 92), then a check is made to determine if there are additional blobs in the circle 74. If there is another blob, ("No" branch of decision block 98), then the next blob is selected in block 100 and the process repeats at block 88. If there are no additional blobs ("Yes" branch of decision block 98), then the identification process completes at block 96. If the "L" pattern 20 is not located, the target may be rotated. In this instance, the process of flowchart 82 may be repeated by either rotating the image of the target 10, 12 or rotating the search in the process by 90 degrees such that all four cardinal direction may be checked.

Figure 10:
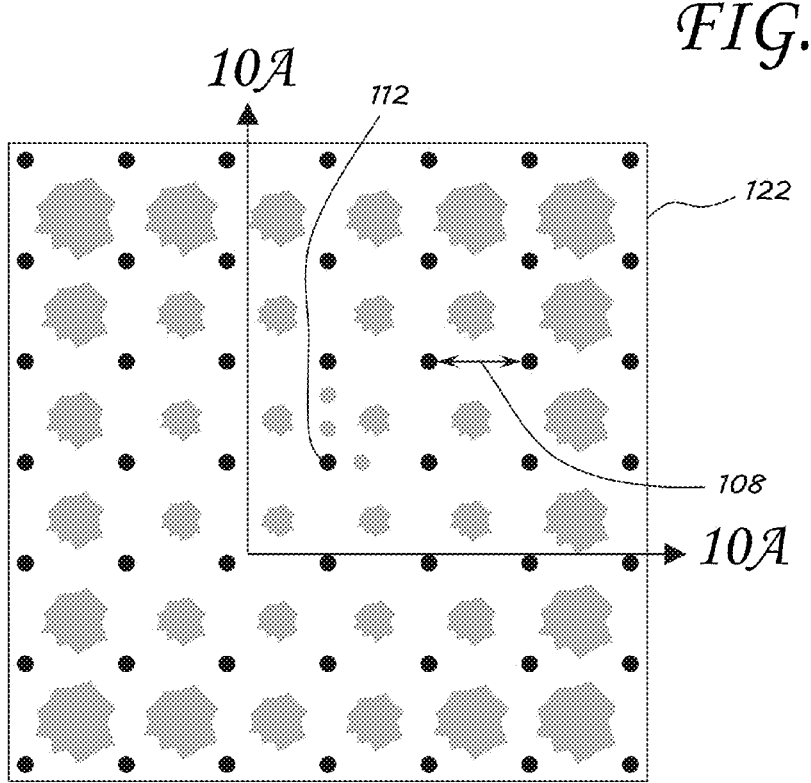
FIG. 10 is an illustration of locating objects on the generic target in FIG. 7.
Figure 9:
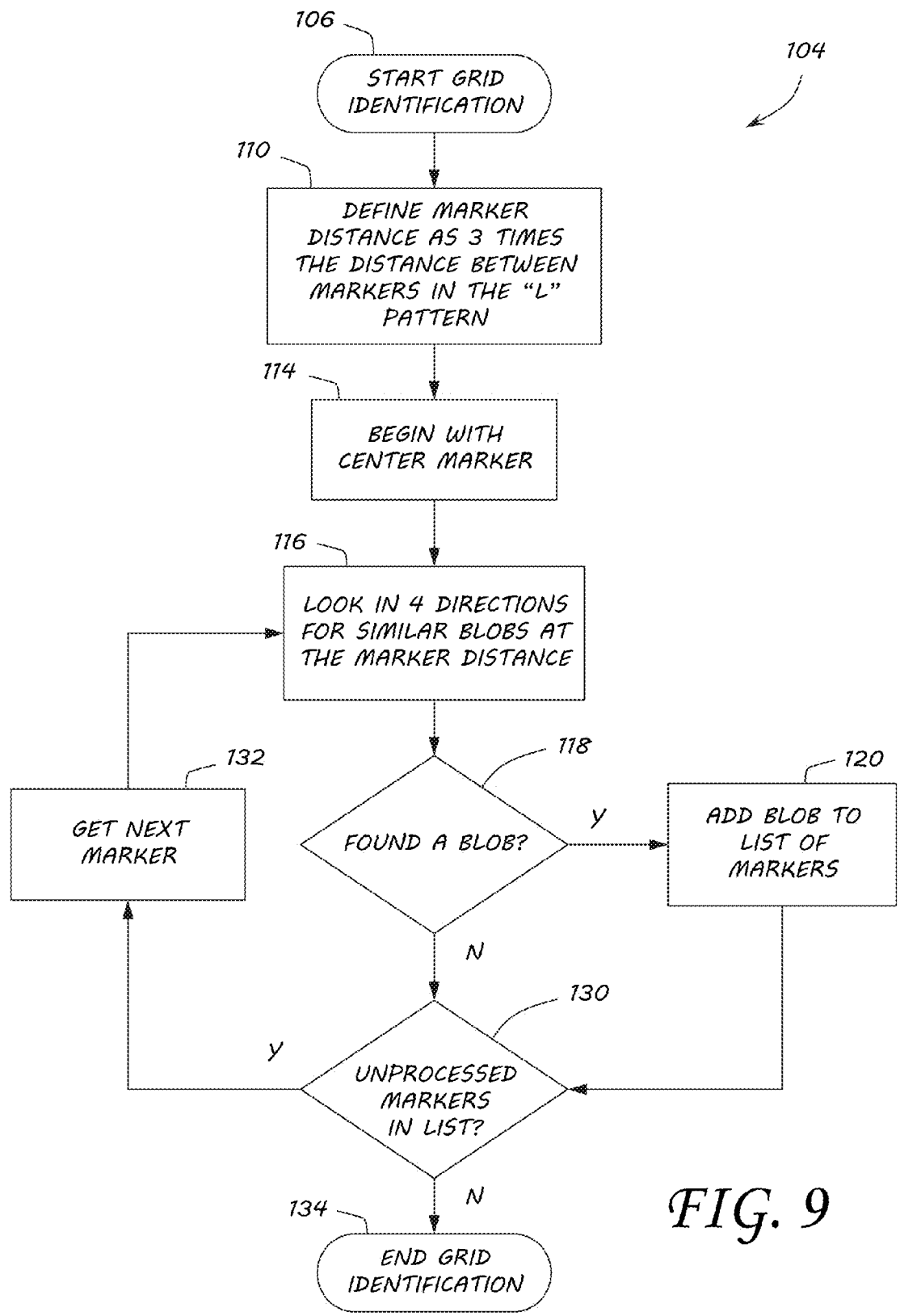
FIG. 9 is a flow diagram of another process of the first phase in FIG. 5.
Figure 10A:
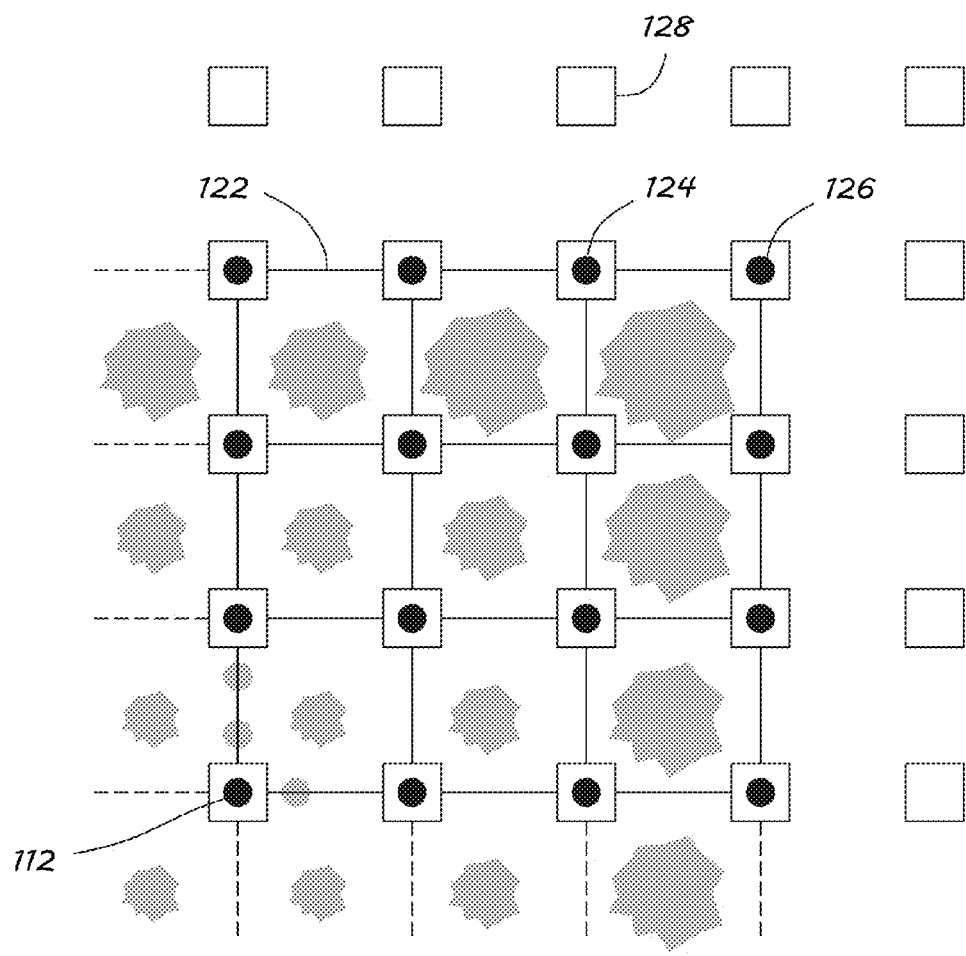
FIG. 10A is an expanded portion of the generic target in FIG. 10.

Returning now to flowchart 60 in FIG. 5, after the "L" pattern 20 has been identified in block 80, the remaining grid of landmarks 18 is identified in block 102. Flowchart 104 in FIG. 9 provides additional detail for this process. The grid identification process begins at block 106. A landmark distance 108, shown on FIG. 10, is defined as three times the distance between landmarks in the "L" pattern 20 in block 110, though in other embodiments, the landmark distance 108 may be defined differently. Beginning with the landmark 112 at the center, determined from the "L" pattern 20, in block 114, search for similar blobs at the landmark distance 108 in four directions. If a blob is found ("Yes" branch of decision block 118), then the blob is added to the list of landmarks 18 in block 120. This process is further illustrated in the portion of target 122 in FIG. 10A. For example, beginning with landmark 124, a blob was located at the search position 126 in one direction, which would be added to the list of landmarks, but a blob was not located at the search position 128.

If a blob was not found at the search position ("No" branch of decision block 118), or after a blob is added to the list of landmarks in block 120, a check is made to determine if any unprocessed landmarks remain in the list of landmarks. If there are additional unprocessed landmarks ("Yes" branch of decision block 130), then the next landmark is selected in block 132 and the search process is repeated at block 116. If there all of the landmarks have been processed ("No" branch of decision block 304) the grid identification process completes in block 134.

Figure 12:
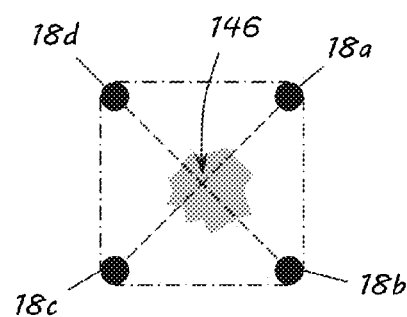
FIG. 12 illustrates an exemplary cell portion of the generic target in FIG. 7.
Figure 11:
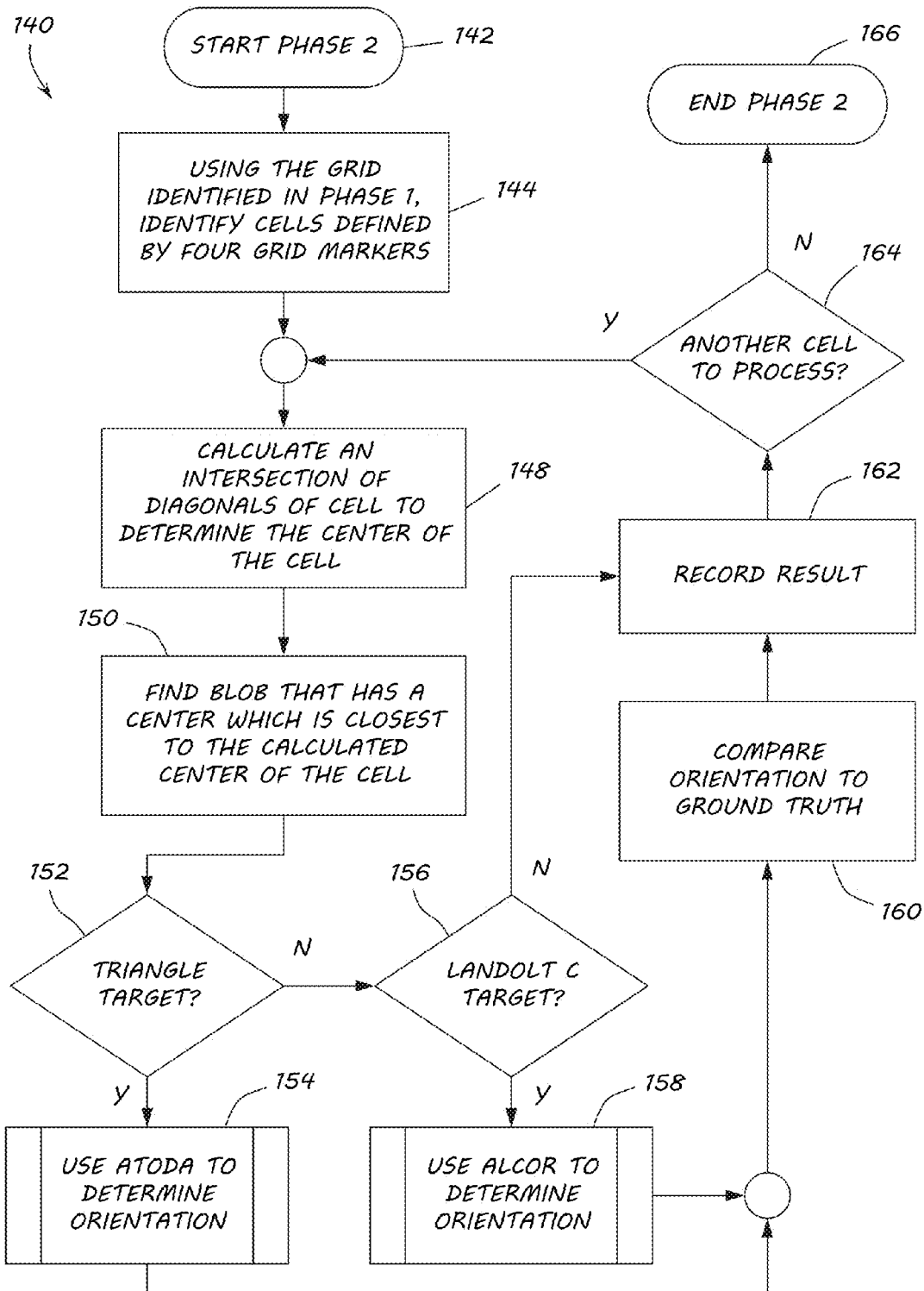
FIG. 11 is a flow diagram of a second phase of the process of FIG. 5.
Figure 13A:
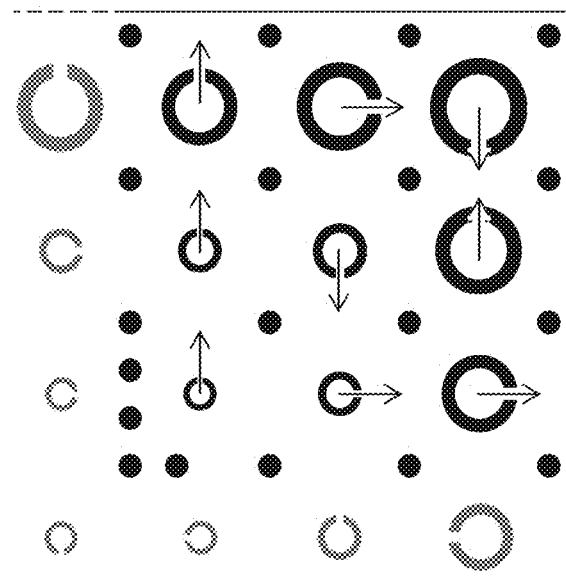
FIGS. 13A and 13B illustrate portions of the targets of FIGS. 1 and 2 overlaid with orientation information.
Figure 13B:
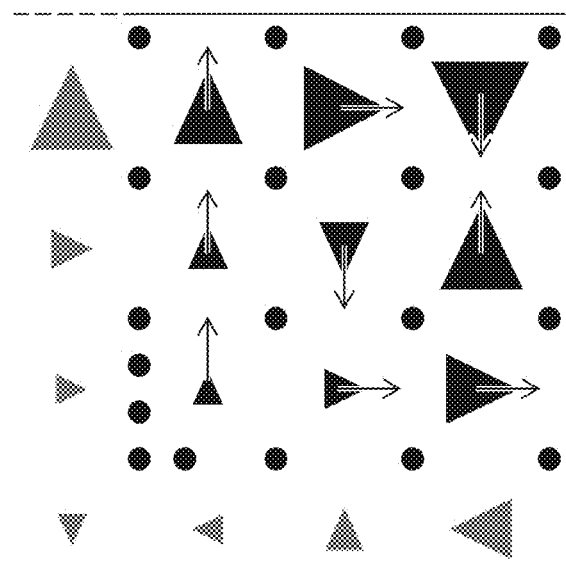

Returning again to flowchart 60 in FIG. 5, after the "L" pattern 20 has been identified in block 80 and the grid of landmarks 18 has been identified in block 102, the first phase completes in block 136. Phase 2 uses the information from the first phase. Flowchart 140 in FIG. 11 illustrates key steps for the second phase. Phase one begins at block 142. Using the grid of landmarks identified in Phase 1, identify cells defined by four grid landmarks 18a-18d at block 144 and illustrated in FIG. 12. Based on each set of four landmarks 18a-18d in a cell, an intersection 146 of diagonals of the cell is calculated to determine the center of the cell in block 148. In block 150, a blob is located that has a center that is closest to the calculated center of the cell. If the test object is a triangle ("Yes" branch of decision block 152), then an automatic triangle orientation detection algorithm is used to determine the orientation of the triangle in block 154. If the test object is a Landolt C ("Yes branch of decision block 156), then an automatic Landolt C orientation detection algorithm is used to determine the orientation of the Landolt C in block 158. In some embodiments, the detection algorithm may make the determination as to the type of test object. In other embodiments, the test object type may be known prior to the determination of the orientations. The orientations determined in either block 154 or block 158 are compared to ground truth orientations of the target in block 160 and as graphically illustrated in FIGS. 13A and 13B. The comparison result of the test objects on the target is recorded in block 162. Additionally, block 162 records any unidentified targets ("No" branch of decision block 156). If there is another cell to process ("Yes" branch of decision block 164) the process repeats with the next cell at block 148. Otherwise ("No" branch of decision block 164), phase two completes at block 166.

After the completion of the two phases, the target 10, 12 may be rotated 90 degrees and the two phases repeated until the target has been analyzed in four different orientations. This process provides 16 independent assessments of orientation of the target 10, 12 for each of the nine test object 14, 16 sizes. In other embodiments, the target 10, 12 may be laterally translated a small about (e.g. a fraction of a critical resolution dimension) and the four orientations of the above procedure could be repeated to produce another set of 16 independent assessments for analysis.

Figure 14:
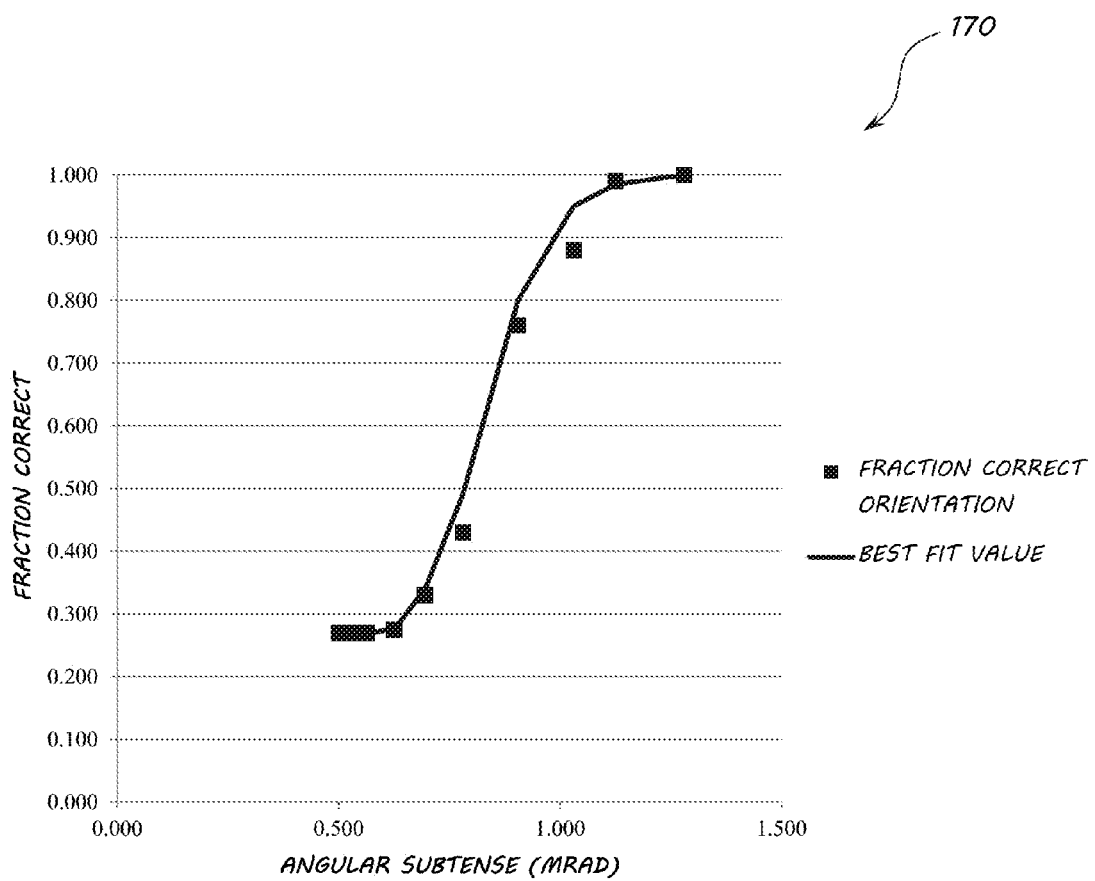
FIG. 14 is a graph illustrating a fraction correct curve.

The recorded results of block 162 of FIG. 11 may include statistical output of the fraction of test objects correctly identified in each target size. This type of output may assist in producing a "fraction correct vs. size" probability curve for assessing resolution of any sensor. An example of such a curve is illustrated in graph 170 in FIG. 14. In some embodiments, where the sensor is directly connected to the computer 30, these results may be provided in real time.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. For example, the above described embodiments eliminate the need for time consuming and costly testing of human observers using a limited number of experimental conditions. Additionally, laboratory set-ups with test objects (Landolt Cs, triangles, or other periodic resolution sensitive targets), placed at multiple test distances and orientations is no longer necessary. The invention in its broader aspects is therefore not limited to the specific details, representative apparatus and method, and illustrative examples shown and described. Accordingly, departures may be made from such details without departing from the scope of the general inventive concept.

What is claimed is:

1. A system comprising:
    a target placed at a distance from a focal plane of the optical sensor and oriented in a first orientation, the target and comprising a grid and a plurality of test objects having different sizes and orientations;
    a memory;
    a processor; and
    program code resident in the memory and configured assess a resolution of an optical sensor, the program code further configured, when executed on the processor, to identify the target grid in an image of the target acquired by the optical sensor; using the identified grid, identify each test object of the plurality of test objects and determine an orientation of the identified test object; compare the determined orientations of the identified test objects of the plurality of test objects to a ground truth; and present the comparisons.

2. The system of claim 1, wherein the target further comprises an asymmetrical pattern located at a center of the grid and wherein the program code is further configured to identify the target grid in the acquired image by:
    identifying the asymmetrical pattern; and
    identifying the grid by:
        defining a distance between landmarks defining the grid;
        beginning with a center landmark identified in the asymmetrical pattern, searching for landmarks at the defined distance away from the center landmark; and
        continuing to search for additional landmarks at the defined distance away from the landmarks located in a previous search.

3. The system of claim 2, wherein the asymmetrical pattern is an L shaped pattern and wherein the program code is further configured to identify the asymmetrical pattern by:
    selecting a first potential landmark of the grid;
    searching for a matching landmark one landmark width to the right;
    searching for a matching landmark one landmark width above; and
    searching for a matching landmark two landmark widths above.

4. The system of claim 3, where the program code is further configured to:
    repeat the searching for landmarks up to 3 additional times with the search directions altered,
    wherein the search directions are altered to search each of four cardinal directions.

5. The system of claim 3, wherein the program code is further configured to, in response to not locating any of the matching landmarks, select a next potential landmark of the grid; search for a matching landmark one landmark width to the right; search for a matching landmark one landmark width above; and search for a matching landmark two landmark widths above.

6. The system of claim 2, wherein the program code is further configured to identify each test object of the plurality of test objects and determine an orientation of the identified test object by:
    defining a cell of adjacent landmarks of the grid;
    calculating a center of the cell;
    locating a test object closest to the center of the cell; and
    determining the orientation of the located test object.

7. The system of claim 1, wherein the plurality of test objects on the target comprises Landolt Cs.

8. The system of claim 1, wherein the plurality of test objects on the target comprises triangles.

9. A program product comprising:
    a non-transitory computer recordable type medium; and
    program code configured assess a resolution of an optical sensor, the program code resident on the computer recordable type medium and further configured, when executed on a hardware implemented process, to identify a target grid in an image of a target acquired by the optical sensor; using the identified grid, identify each test object of a plurality of test objects on the target and determining an orientation of the identified test object; compare the determined orientations of the identified test objects of the plurality of test objects to a ground truth; and present the comparisons.

10. The program product of claim 9, wherein the target includes an asymmetrical pattern located at a center of the grid and wherein the program code is further configured to identify the target grid in the acquired image by:
    identifying the asymmetrical pattern; and
    identifying the grid by:
        defining a distance between landmarks defining the grid;
        beginning with a center landmark identified in the asymmetrical pattern, searching for landmarks at the defined distance away from the center landmark; and
        continuing to search for additional landmarks at the defined distance away from the landmarks located in a previous search.

11. The program product of claim 10, wherein the asymmetrical pattern is an L shaped pattern and wherein the program code is further configured to identify the asymmetrical pattern by:
    selecting a first potential landmark of the grid;
    searching for a matching landmark one landmark width to the right;
    searching for a matching landmark one landmark width above; and
    searching for a matching landmark two landmark widths above.

12. The program product of claim 11, wherein the program code is further configured to, in response to not locating any of the matching landmarks, select a next potential landmark of the grid; search for a matching landmark one landmark width to the right; search for a matching landmark one landmark width above; and search for a matching landmark two landmark widths above.

13. The program product of claim 10, wherein the program code is further configured to identify each test object of the plurality of test objects and determine an orientation of the identified test object by:
    defining a cell of adjacent landmarks of the grid;
    calculating a center of the cell;

locating a test object closest to the center of the cell; and
determining the orientation of the located test object.

\* \* \* \* \*